S. TODA.
COMBINED MIXER, WEIGHER, AND SIFTER.
APPLICATION FILED JUNE 14, 1913.
1,121,310.
Patented Dec. 15, 1914.
2 SHEETS—SHEET 2.
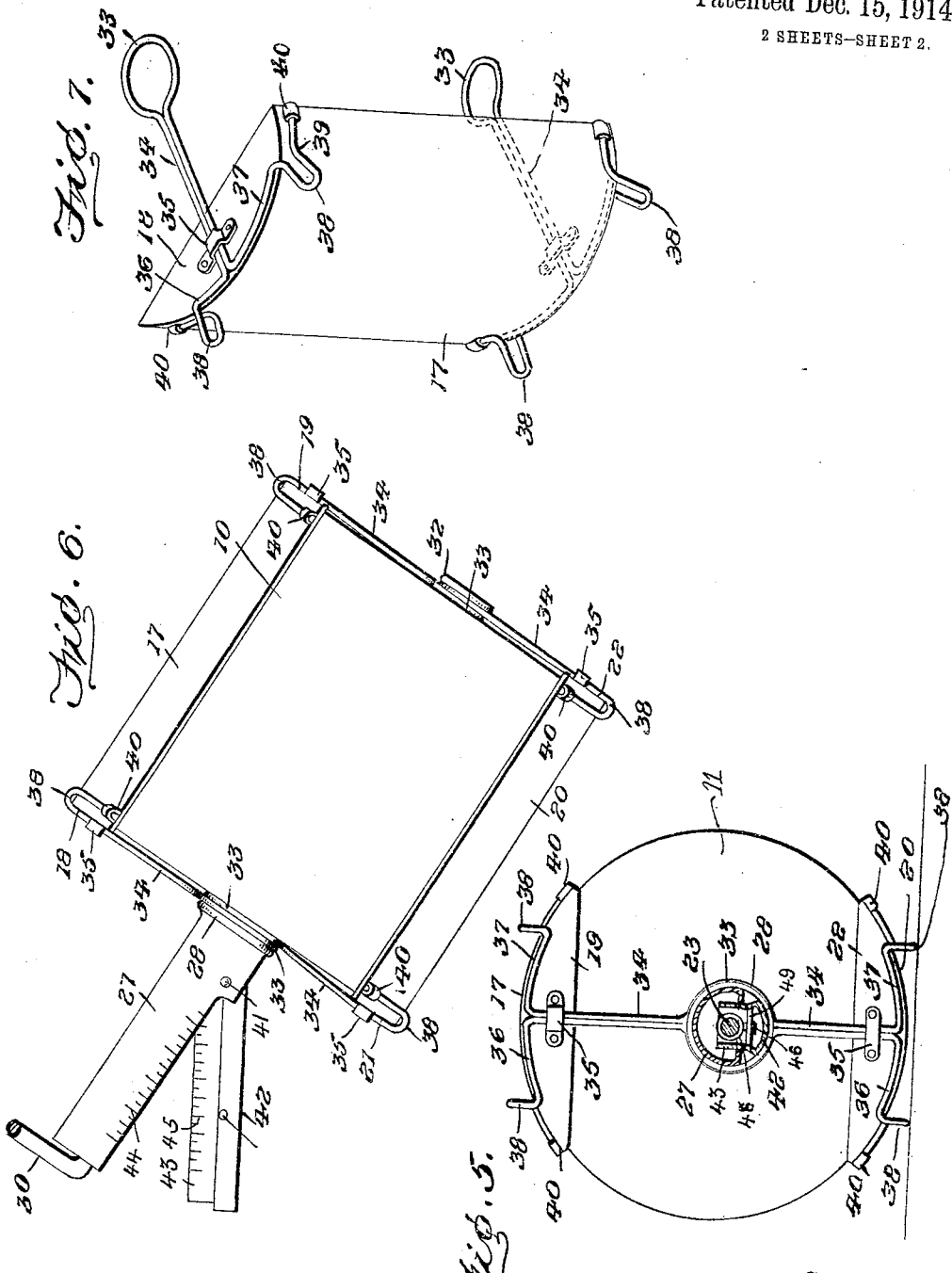
Inventor
Sozaburo Toda
By
Attorneys.

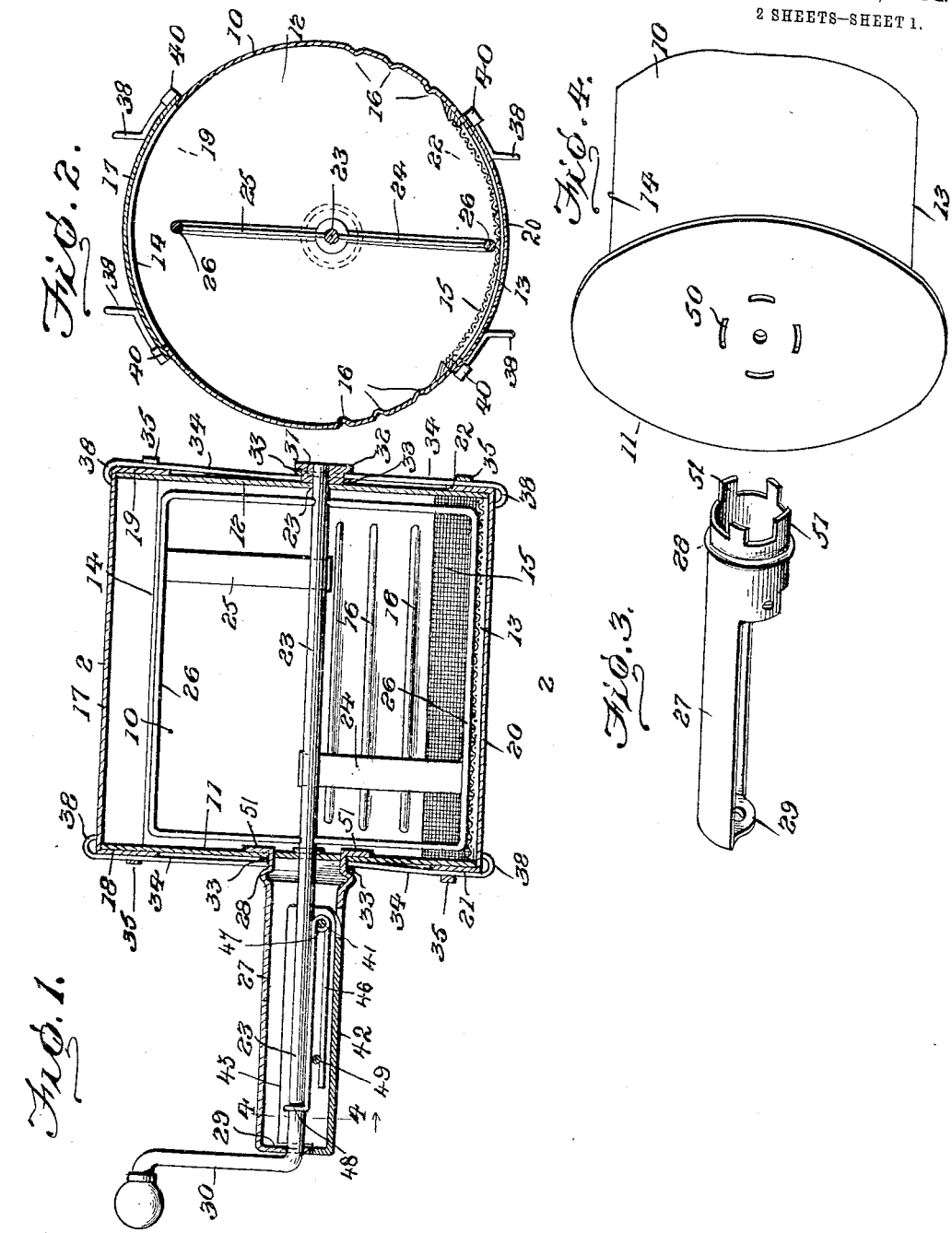

UNITED STATES PATENT OFFICE.

SOZABURO TODA, OF NEW YORK, N. Y.

COMBINED MIXER, WEIGHER, AND SIFTER.

1,121,310.  Specification of Letters Patent.  Patented Dec. 15, 1914.

Application filed June 14, 1913. Serial No. 773,647.

*To all whom it may concern:*

Be it known that I, SOZABURO TODA, subject of the Emperor of Japan, residing at New York, in the county of New York and State of New York, have invented certain new and useful Improvements in Combined Mixers, Weighers, and Sifters, of which the following is a specification.

This invention relates to improvements in devices for sifting and mixing flour and other ingredients in preparing the same for making of bread, cakes, pastry and the like, and likewise for weighing the ingredients, and has for one of its objects to simplify and improve the construction and increase the efficiency and utility of devices of this character.

Another object of the invetnion is to provide a simply constructed device whereby the various ingredients may be thoroughly mixed and then sifted, and the condition of the ingredients and the amount contained in the device indicated.

With these and other objects in view the invention consists in certain novel features of construction as hereinafter shown and described and then specifically pointed out in the claims, and in the drawings illustrative of the preferred embodiment of the invention, Figure 1 is a longitudinal sectional elevation. Fig. 2 is a transverse section on the line 2—2 of Fig. 1. Fig. 3 is a detached perspective view of the main handle member. Fig. 4 is a perspective of a portion of the casing. Fig. 5 is a transverse section on the line 4—4 of Fig. 1 looking in the direction of the arrow. Fig. 6 is a view illustrating the use of the device for weighing the ingredients. Fig. 7 is a detached perspective view of one of the movable closures.

Corresponding and like parts are referred to in the following description and indicated in all the views of the drawings by the same reference characters.

The improved device comprises a body preferably cylindrical and including the side portion 10 and ends 11—12. The body 10 is provided with relatively large oppositely disposed openings 13—14 with a wire screen or sieve 15 arranged over one of the openings, for instance the opening 13.

Formed in the body 10 at one side are a plurality of graduations 16 to indicate the contents of the body in pints, quarts, or the like, the graduations being formed by compressing the material of the body either inwardly or outwardly.

The opening 14 is provided with a closure 17 which is segmental in outline to conform to the outline of the body and with inwardly segmental ends 18—19 which extend over the ends of the casing for a distance, while the opening 13 is provided with a similar segmental closure 20 having inwardly directed segmental ends 21—22 extending for a distance over the ends of the casing.

Extending through the ends 11—12 of the casing 10 is a shaft 23, the shaft being located nearer the opening 13 than the opening 14 as indicated in Fig. 2.

Attached to the shaft 23 within the body 10 are radial arms 24—25, preferably extending in opposite directions and spaced apart. Connected to the outer ends of the arms 24—25 is an endless wire loop 26, the members 24—25—26 forming a combined agitator and mixer which operates to thoroughly disintegrate and mix the ingredients and likewise to force them through the screen 15 when the closure 20 is open. The members 24—25 being of equal length, and the sides of the member 26 being spaced at equal distances from the shaft 23, when the latter is rotated the sides of the member 26 travel in close proximity to the inner face of the screen 15 which is concentric to the shaft 23, but do not engage against the inner walls of the body or the closure 17 for the reason as before stated that the shaft 23 is set off from the center of the body. By this means the material within the body is forced through the screen while at the same time the portions 26 of the agitator do not engage against the body of the device. The friction thereby is materially reduced and the efficiency of the device correspondingly increased.

Rigidly connected to the end 11 of the body and at one side of the center thereof, is a handle member comprising a body portion 27 which is circular in outline at its lower end, or where it is united to the end 11, and is formed with an annular outwardly projecting stop rib 28 spaced slightly from the lower end of the handle. The body portion of the handle is preferably formed of sheet metal pressed into the required shape and partly closed at the outer end as represented at 29 to form the outer bearing for the shaft 23, the latter being bent into a lateral crank 30 whereby the shaft is rotated. At the end opposite to the crank 30 the shaft 23 is stepped in a sleeve 31 having a flange 32 at its outer end.

The segmental closures 17—20 are yieldably coupled to the handle 27 and to the sleeve 31 by wire devices, one at each end of the closures, each wire device forming a combined yieldable holder and supporting feet, but as the wire devices are precisely alike, the description of one will suffice for all.

Each of the wire devices is formed from a single strip of resilient wire, and bent intermediate the ends into a loop 33 to bear around the handle 27 between the stop rib 28 and the adjacent face of the end 11 of the casing at one end of the casing, and around the sleeve 31 and between the flange 32 and the end 12 of the casing at its opposite end, the loops which engage around the handle being larger than the loops which engage around the sleeve, this being the only difference between the wire devices at the opposite ends of the casing. The parts of the wire member are brought together in parallel relations for a distance as represented at 34 and slidably supported relative to the segmental ends of the closures by clips 35. Beyond the clips the wire device is bent in opposite directions as represented at 36—37 and curved to conform to the outlines of the outer face of the closure and thence bent into outwardly directed loops 38 and with the ends supported in clips 40. The outwardly directed loops 38 project beyond the outer face of the closures to a sufficient extent to form feet to support the casing free from the table or other support upon which it may be placed, and thus retained in position. The loops thus perform the twofold function of feet to support the device and likewise as springs to maintain the closures 17—20 yieldably in engagement with the outer casing, and thus prevent leakage between the closures and the casing. The shaft 23, as before stated, being located at one side of the center, and the wire device being arranged to rotate around the handle 27 and the sleeve 23 which is concentric to the shaft, the yieldableness of the closures will permit them to be moved over the imperforate sides of the casing when the openings 13—14 are to be uncovered, and be prevented at all times from looseness or rattling, no matter in what position the closures may be placed. By this arrangement it will be obvious that the closures may be moved into the position shown in Fig. 4 to cover the openings, or to be moved over the imperforate portion of the casing when the closures are to be opened. The closures are thus entirely independent and either one or both may be moved as required.

The end 11 of the casing is formed with a plurality of segmental slots 50 concentric to the bearing for the shaft 23, and the handle member 27 is provided with a plurality of protruding portions 51 adapted to pass through the slots 50 and be turned laterally to secure the handle to the casing.

A pin 41 extends through the lower end of the handle 27, and pivoted upon the pin within the socket is another coacting handle member represented as a whole at 42 with its inner edge reduced to form a longitudinal rib-like portion 43 adapted to enter between the sides of the reduced portion of the handle member 27 as shown in Fig. 5. By this means when the two handle portions 27—42 are disposed in closed position, or with the rib-like portion 43 within the main handle member, the two parts 27—42 are substantially cylindrical in outline. The handle member 27 is provided with a scale, indicated at 44, representing pounds or other graduations, while the adjacent face of the rib-like portion 43 is provided with corresponding graduations indicated at 45, the object to be hereafter explained.

Disposed between the handle members 27—42 is a spring represented as a whole at 46 bent into V-shape, whereby outwardly directed arms are produced with a coil 47 at the juncture of the arms, the pin 41 extending through the coil, as shown. One of the arms is provided with a laterally extending eye 48 which surrounds the shaft 23, while the other arm of the spring bears in the rear of a stop pin 49 in the handle member 42, the spring thus exerting its force to maintain the two members 27—42 yieldably in closed position, the object to be hereafter explained.

If the ingredients are to be mixed without being screened or sifted the closure 20 is moved into position over the opening 13 to prevent material passing through the screen. If the material is to be sifted then the closure 20 is disposed in open position and the device arranged with the screen downwardly and over a suitable receptacle, and then by rotating the shaft 23 the material is forced through the screen by the action of the agitator.

In operating the device if the material is to be sifted the operator grasps the two handle members 27—42 and employs them to hold the device with the closure 20 in open position and rotates the shaft 23. If the ingredients are to be weighed the operator grasps the portion 42 only of the handle and holds the latter substantially in horizontal position with the body 10 and its attachments unsupported. The spring 46 is of sufficient strength to hold the two parts 27—42 of the handle in close contact and in parallel relations when the body 10 is empty. The graduations are so arranged that when a certain predetermined weight of material, for instance one ounce, is disposed within the body at the outer end of the same, the weight thus disposed will be sufficient to depress the outer end of the body and rotate the handle member 27 upon its pivot 41 until the ounce graduation upon the handle member 27 "cuts" the ounce graduation of the handle member 42. If additional weight is disposed in the body the outer end of the latter will be depressed to a greater extent, or until the corresponding graduation upon the member 27 which corresponds to the weight in the body cuts the corresponding graduation upon the member 42. By this simple means the contents of the body may be accurately weighed either before or after the mixing.

Having thus described the invention, what is claimed as new is:

1. In a device of the class described, a receiver, a handle member rigidly connected to said receiver, another handle member swinging at one end from said rigid handle member, with the adjacent edges of the handle members crossing each other obliquely, and a balancing device between the handle members and operating to maintain the same yieldably in close relations, said handle members having coacting graduations to indicate the weight of the contents of the receiver.

2. In a device of the class described, a receiving body including a head member having a plurality of sockets, a handle member having projections engaging through said sockets and bent laterally against the inner face of the head to rigidly connect said handle member to said body, another handle member swinging from said rigid handle member, a balancing device between the handle members and operating to maintain the same yieldably in close relations, said handle members having coacting graduations to indicate the weight of the contents of the body.

3. In a device of the class described, a receiving body, a handle member having the outer portion reduced and rigidly connected to said body, another handle member swinging from the unreduced portion of said rigid handle member and engaging against the reduced portion of the same, said handle members having coacting graduations to indicate the weight of the contents of the body, and a balancing device operating to maintain the handle members yieldably in close relation.

4. In a device of the class described, a receiving body, a handle member rigidly connected to said body and having a plurality of graduations, a shaft mounted for rotation through said rigid handle member, another handle member swinging from said rigid handle member and having a plurality of graduations coacting with the graduations of said rigid handle member, and a balancing device including spaced members coupled respectively to said swinging handle member and to said shaft and operating to maintain the handle members yieldably in close relations.

5. In a device of the class described, a receiving body, a handle member rigidly connected to said body and having a plurality of graduations, a shaft mounted for rotation through said rigid handle member, another handle member pivoted to said rigid handle member and having a plurality of graduations coacting with the graduations of said rigid handle member, and a balancing device, formed of resilient material and including a coil engaging around said pivot and coupled respectively to said pivoted handle member and to said shaft.

6. In a device of the class described, a receiving body, a handle member rigidly connected to said body and having a plurality of graduations, another handle member pivoted to said rigid handle member and having a plurality of graduations coacting with the graduations of said rigid handle member, and a balancing device formed of resilient material and including a coil engaging around said pivot and coupled respectively to said handle members.

7. In a device of the class described, a receiver, a handle member rigidly connected to said receiver, another handle member pivotally connected to the rigid handle member, with the adjacent edges of the handle members crossing each other obliquely, a balancing device coacting with the handle members and operating to maintain the same yieldably in predetermined relation, said adjacent edge of said handle members having coacting graduations to indicate in weight units any change in the relation of the handle members.

8. In a device of the class described, a receiver, a member rigid with and projecting from the receiver, a member pivotally connected relative to the receiver, the adjacent edges of the pivotally united members crossing each other obliquely, and means urging said pivoted member into predetermined relation with the rigid member, said rigid and pivoted members having coacting graduations indicating in weight units any change in their relation.

9. In a device of the class described, a receiver, a handle member rigidly connected to the receiver, another handle member pivoted to the first-mentioned handle member, the adjacent edges of the handle members crossing each other obliquely, means for urging said handle members into a predetermined relation, and means for indicating in weight units any change in the relation of the handle members.

In testimony whereof I affix my signature in presence of two witnesses.

SOZABURO TODA. [L. S.]

Witnesses:
CARL A. KARLSON,
CHARLOTTE E. KARLSON.

Copies of this patent may be obtained for five cents each, by addressing the "Commissioner of Patents, Washington, D. C."